No. 745,991. PATENTED DEC. 8, 1903.
F. S. BALDWIN.
COMPUTING AND RECORDING MACHINE.
APPLICATION FILED AUG. 8, 1902.
NO MODEL. 6 SHEETS—SHEET 1.

Witnesses
Geo. E. Kuch.
C. R. Wright

Inventor
F. S. Baldwin,
A. S. Pattison,
By Attorney

THE NORRIS PETERS CO., PHOTO-LITHO., WASHINGTON, D. C.

No. 745,991. PATENTED DEC. 8, 1903.
F. S. BALDWIN.
COMPUTING AND RECORDING MACHINE.
APPLICATION FILED AUG. 8, 1902.
NO MODEL. 6 SHEETS—SHEET 2.

Witnesses
Geo. E. Frech
C. R. Wright Jr.

Inventor
F. S. Baldwin,
By A. S. Pattison,
Attorney

No. 745,991. PATENTED DEC. 8, 1903.
F. S. BALDWIN.
COMPUTING AND RECORDING MACHINE.
APPLICATION FILED AUG. 8, 1902.
NO MODEL. 6 SHEETS—SHEET 3.

Witnesses
Geo. E. Frech.
C. R. Wright

Inventor
F. S. Baldwin,
By A. S. Pattison,
Attorney

THE NORRIS PETERS CO., PHOTO-LITHO., WASHINGTON, D. C.

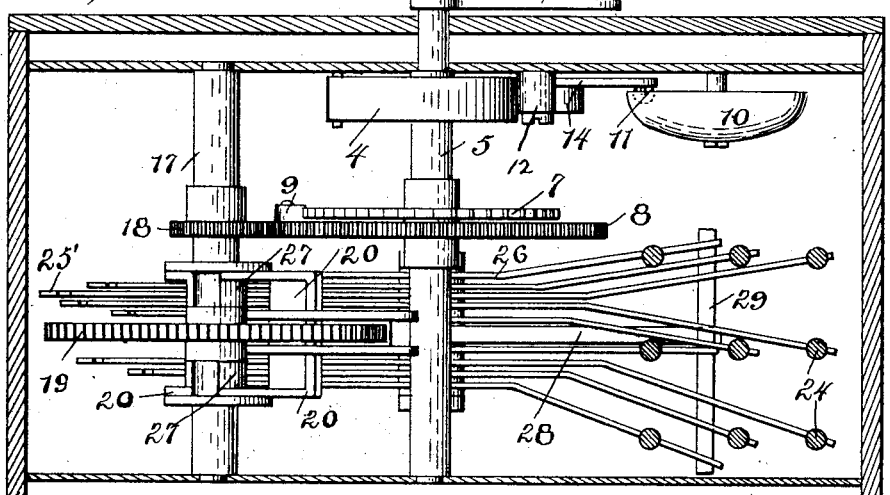
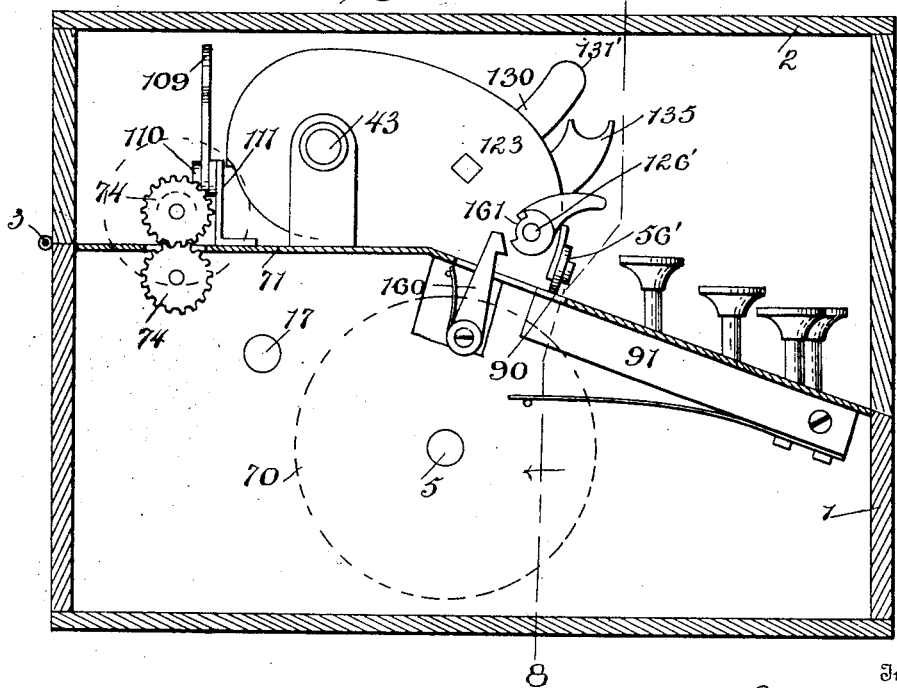

No. 745,991. PATENTED DEC. 8, 1903.
F. S. BALDWIN.
COMPUTING AND RECORDING MACHINE.
APPLICATION FILED AUG. 8, 1902.
NO MODEL. 6 SHEETS—SHEET 5.
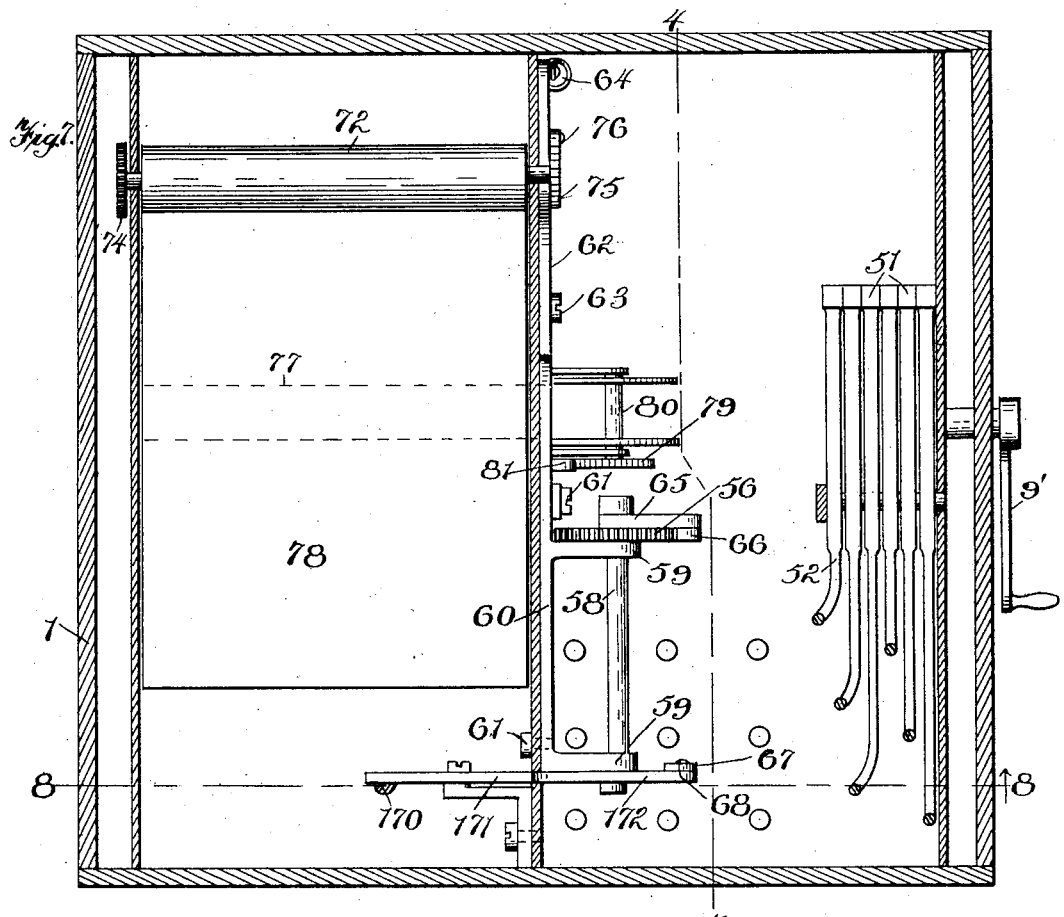
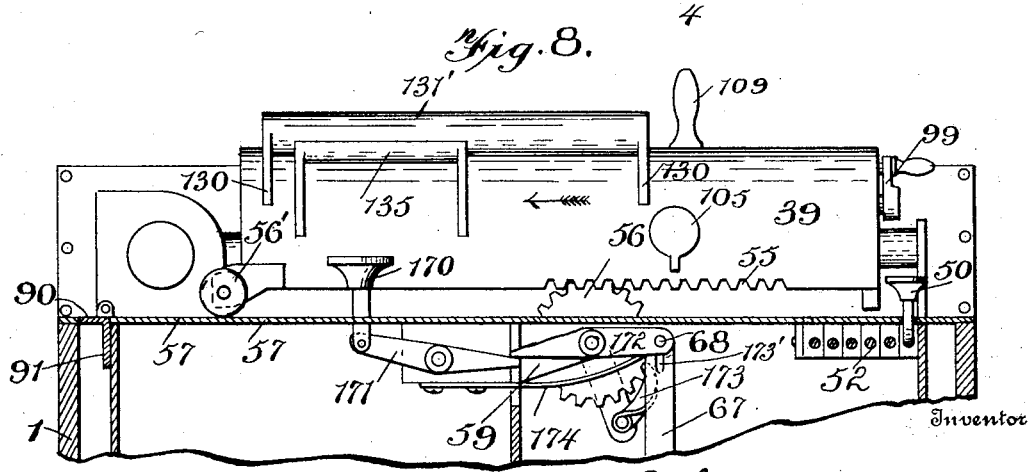

No. 745,991. PATENTED DEC. 8, 1903.
F. S. BALDWIN.
COMPUTING AND RECORDING MACHINE.
APPLICATION FILED AUG. 8, 1902.

NO MODEL. 6 SHEETS—SHEET 6.

Witnesses

Inventor
F. S. Baldwin,
By A. S. Pattison,
Attorney

No. 745,991. Patented December 8, 1903.

UNITED STATES PATENT OFFICE.

FRANK S. BALDWIN, OF NEWARK, NEW JERSEY.

COMPUTING AND RECORDING MACHINE.

SPECIFICATION forming part of Letters Patent No. 745,991, dated December 8, 1903.

Application filed August 8, 1902. Serial No. 118,920. (No model.)

*To all whom it may concern:*

Be it known that I, FRANK S. BALDWIN, a citizen of the United States, residing at Newark, in the county of Essex and State of New Jersey, have invented new and useful Improvements in Computing and Recording Machines, of which the following is a specification.

My invention relates to improvements in computing and recording machines, and pertains to a machine including a mechanism for computing the sum-total of a plurality of numbers or amounts and mechanism for recording the separate or individual amounts and also a mechanism for recording or printing the sum-total of all of the amounts when the computation is completed, all of which, including many auxiliary features, will be fully described hereinafter.

The general object of my present invention is to improve, simplify, and cheapen that class of computing and recording machines which are now used to a considerable extent by banking institutions for calculating and recording the individual amounts and their sum-total, the same being constructed to minimize the probability of errors on the part of the operator and to enable the operator to readily and quickly correct an error and to provide a mechanism which, owing to its simplicity, is less liable to get out of order and which is accurate and positive in its action.

Figure 1:
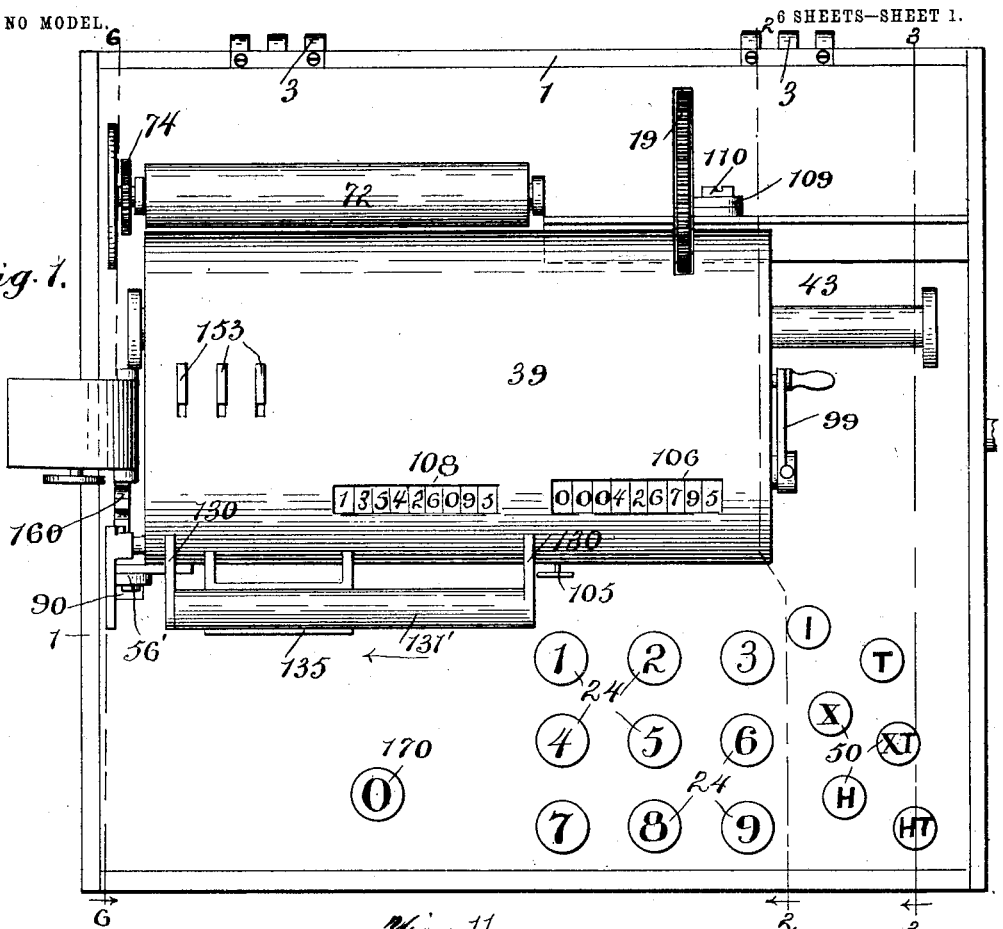
Figure 11:
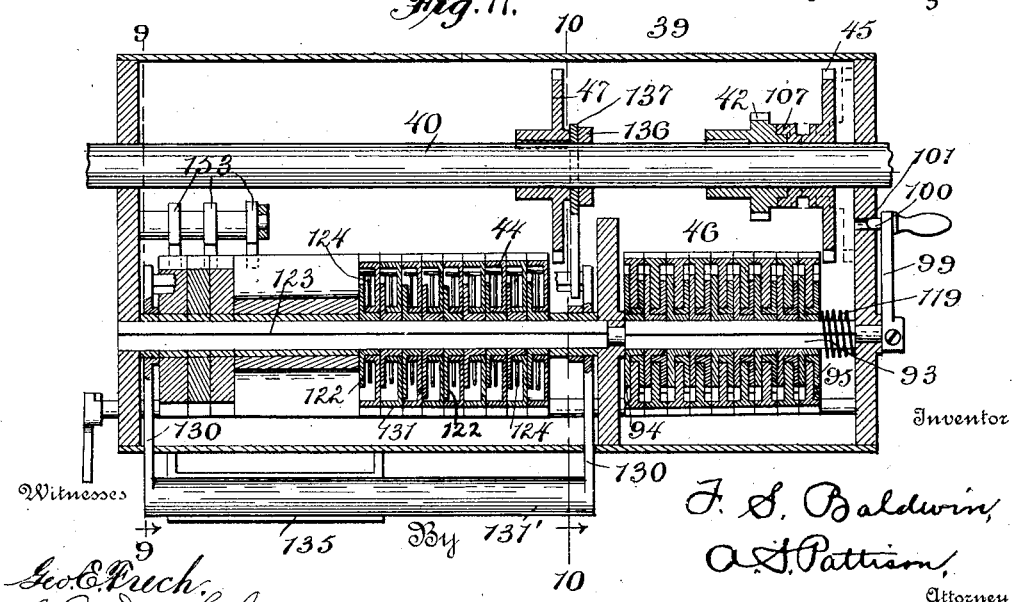
Figure 2:
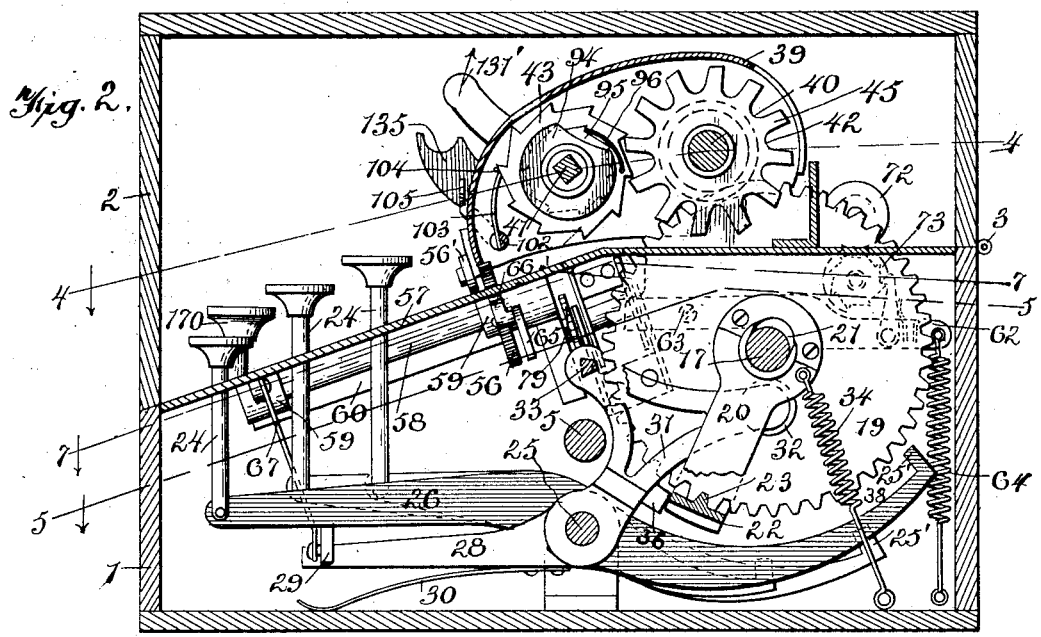
Figure 3:
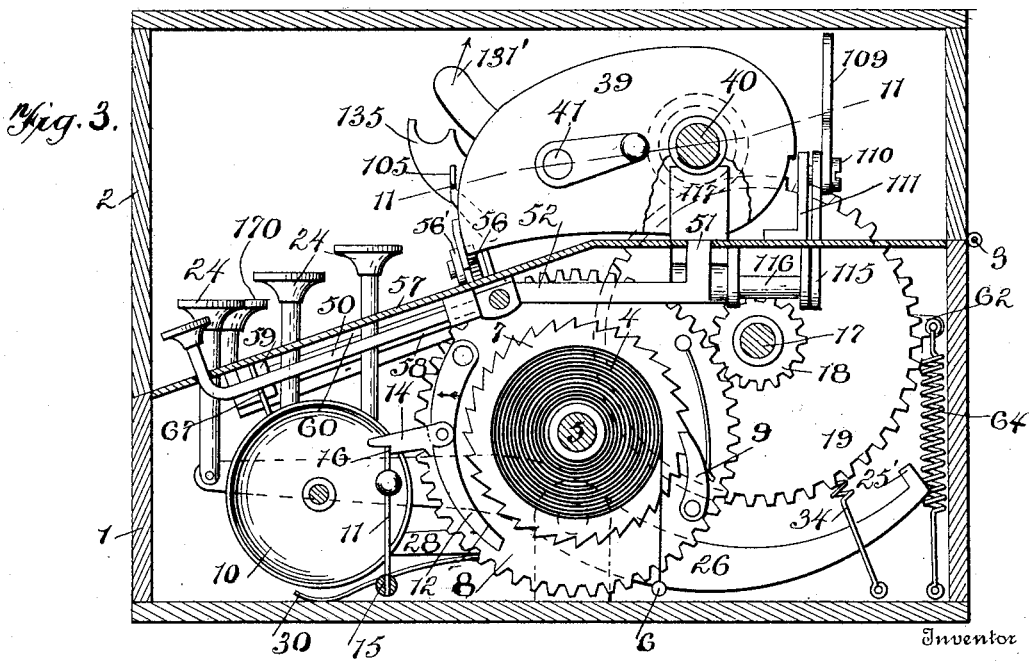
Figure 4:
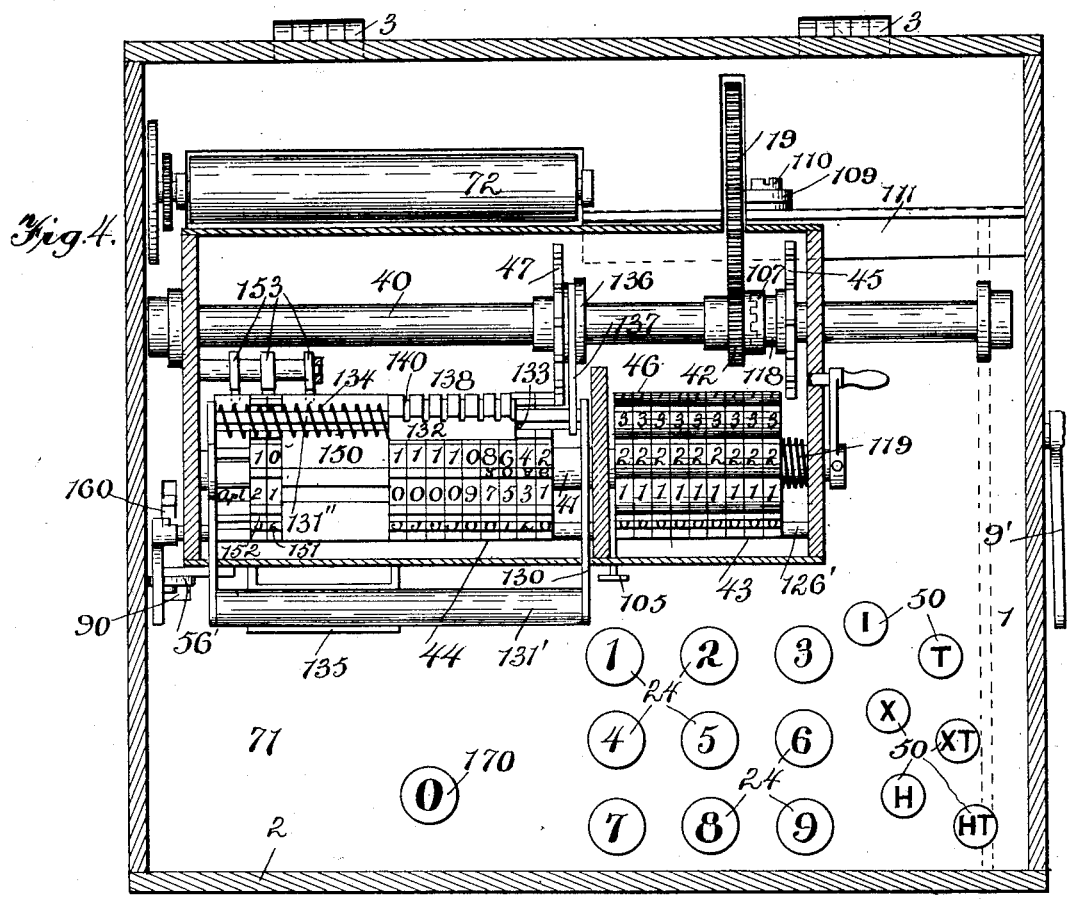
Figures 9, 10:
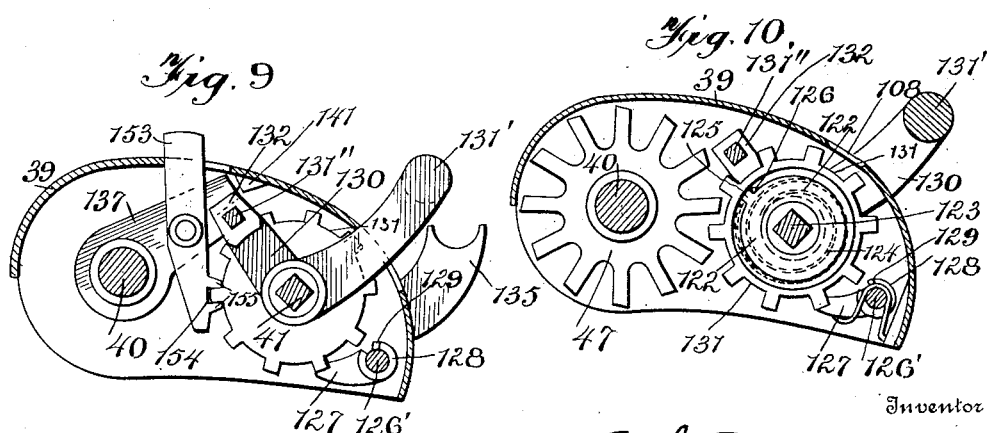
Figure 12:
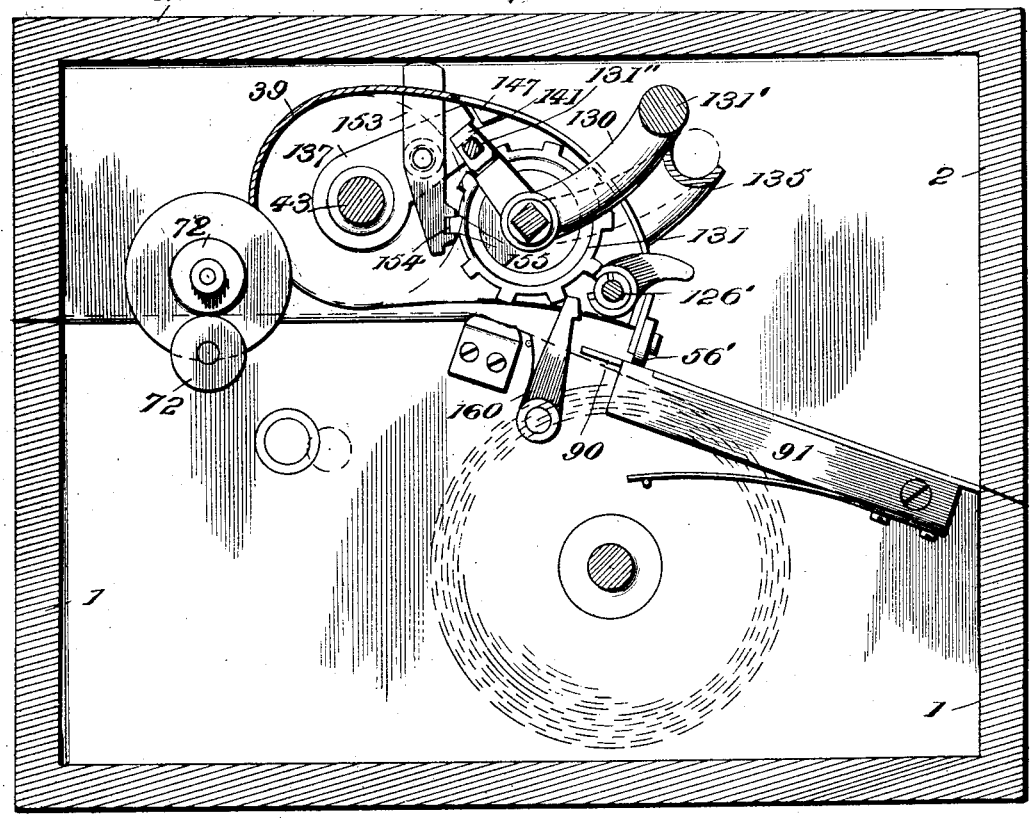
Figure 13:
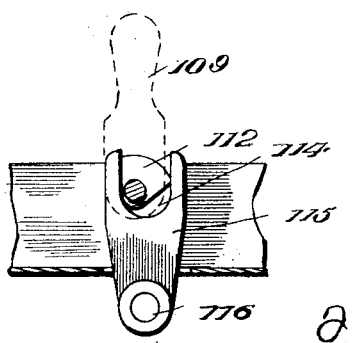

In the accompanying drawings, Figure 1 is a top plan view of a machine embodying my invention with the top of its retaining-case removed. Fig. 2 is a transverse vertical sectional view on the line 2 2 of Fig. 1 looking in the direction indicated by arrow. Fig. 3 is a similar view taken on the line 3 3 of Fig. 1 and looking in the direction indicated by arrow. Fig. 4 is a horizontal sectional view taken on the line 4 4 of Fig. 2. Fig. 5 is a horizontal sectional view on the line 5 5 of Fig. 2. Fig. 6 is a vertical sectional view on the line 6 6 of Fig. 1 and looking in the direction indicated by arrow. Fig. 7 is a horizontal sectional view on the line 7 7 of Fig. 2 with the motor mechanism, the key mechanism, and its connecting parts omitted. Fig. 8 is a vertical sectional view on the line 8 8 of Fig. 7 and looking in the direction indicated by arrow. Fig. 9 is a transverse vertical sectional view through the carriage, taken on the line 9 9 of Fig. 11.
Fig. 10 is a similar view taken on the line 10 10 of Fig. 11. Fig. 11 is a horizontal sectional view taken through the carriage and on the line 11 11 of Fig. 3. Fig. 12 is a view with the left-hand ends of the case 2 and the carriage 39 in Fig. 1 removed. Fig. 13 is a detached view of the lever 109 and its coöperating parts.

My improved computing and recording or printing machine includes a motor-driven mechanism for actuating the computing mechanism and the printing mechanism, an escapement mechanism controlling the motor mechanism and a key mechanism controlling the escapement mechanism, whereby the motor mechanism is controlled and permitted to actuate the computing mechanism a distance corresponding to the numeral indicated by the key depressed and in turn actuating the computing mechanism a corresponding distance to register the number of digits indicated by the key depressed and also control or set the printing mechanism correspondingly, a carriage traveling across the motor-actuating mechanism, the said carriage including the computing and printing mechanism, and also auxiliary mechanisms acting in conjunction with the aforementioned mechanisms for the purposes to be hereinafter explained and also with auxiliary mechanisms for feeding the strips of paper upon which the individual amounts and their sum-total are printed or recorded, and also a mechanism for feeding a printing-ribbon.

In the accompanying drawings, 1 indicates the main or body portion of a box or casing in which the mechanism of my machine is placed and suitably supported, and 2 a cover hinged to the body portion at the point 3, whereby it can be turned backward to permit access to the operating mechanism when the machine is to be used, or, as will be readily understood, the top 2 can be made separate and removable from the body portion.

Situated at and supported by one end of the box or casing is a suitable spring-motor for actuating the computing mechanism and also the numeral-wheels of the recording or printing mechanism. This motor consists of a spring 4, which has one end connected with a shaft 5 and its opposite end attached to a stationary pin or rod 6. Made fast to the shaft 5 is a ratchet-wheel 7, and placed loosely upon the shaft 5 is a large gear 8. This gear 8 carries a spring-pawl 9, which engages the ratchet 7, so that when the spring is unwound it actuates the shaft 5 and in turn the ratchet 7 and through the medium of the pawl 9 also actuates or revolves the large gear 8. The spring is wound through the medium of a suitable handle 9', located outside of the casing 1 and firmly connected with the shaft 5. For the purpose of indicating to the operator when the spring needs winding an alarm device is provided, and this consists of a suitable bell 10, located within the case at a suitable point, and a clapper 11, adapted to ring the bell through the medium of a mechanism consisting of a pivoted lever 12, carrying a hinge or pivoted arm 14, adapted to engage the upper end of the clapper-rod, as clearly shown in Fig. 3. The lower end of the clapper-rod is rigidly supported through the medium of a rod or other member 15, and the clapper-rod is a spring member carrying the clapper. When the spring needs rewinding, it will expand and engage the free end of the lever 12 and move it in the direction indicated by arrow until it forces the shoulder 16 of the pivoted arm 14 out of engagement with the upper end of the clapper-rod, when the clapper-rod will be released and the clapper strike the bell, thus indicating to the operator that the motor is to be wound through the medium of the winding-lever 9'.

A shaft 17 is journaled in the case and extends parallel the shaft 5. This shaft 17 carries a pinion or small gear 18, which is in mesh with the large gear 8 of the spring-motor, and the shaft, through the medium of the pinion and the gear of the motor, is revolved when permitted to do so, as will be readily understood. This shaft 17 is controlled in its revolutions through the medium of an escapement mechanism. This escapement mechanism consists of a large gear 19, which is made fast to the shaft 17, and the gear forms a part of the escapement mechanism and also serves to actuate, through the medium of an intermediate gear, as will appear hereinafter, the computing mechanism and also the numeral-wheels of the printing or recording mechanism.

The escapement mechanism is shown in Fig. 2 and includes an oscillating and reciprocating yoke 20. By reference to Fig. 5 it will be seen that this yoke is essentially U-shaped in contour or form and has its ends journaled upon the shaft 17. In order to permit the yoke to have a transverse reciprocating movement, as well as a circular oscillating movement, the ends of the yoke are provided with longitudinally-arranged slots 21, through which the shaft 17 passes. By this arrangement it will be noted that the yoke may oscillate in the arc of a circle and may reciprocate in a direction transverse the gear 18 and also transverse the shaft 17. This yoke at its transverse portion 22 is provided with a tooth 23, adapted to engage between the teeth of the gear 19, as clearly illustrated in Fig. 2.

The keys 24, each of which represents, respectively, a numeral from "1" to "9," inclusive, as shown in Fig. 1, are intermediately pivoted upon a rod or shaft 25, and their inner ends are provided with shoulders 25', which normally rest at a point outside of the path traveled by the transverse portion 22 of the yoke 20 and will therefore not interfere with the circular oscillating movement of the yoke. When, however, a key-lever is depressed, the shouldered end 25' is moved inward toward the gear 19 and at a point which is in the path traveled by the transverse portion of the yoke and will engage and stop the movement of the yoke. For the purpose of illustrating this position the key-lever 26, Fig. 2, is shown depressed and its shouldered end 25' at a point adapted to engage and arrest the circular oscillation of the yoke. By reference to Fig. 5 it will be noticed that the parallel arms of the yoke are located some distance from the opposite sides of the gear 19. This is for the purpose of providing sufficient space for the inwardly-extending sleeves and collar 27, which are secured to the yoke. The object of these sleeves will now be stated.

Secured to the shaft 25 is what may be aptly termed a "universal" arm 28, which carries at its end which lies under the key-levers a universal transverse bar 29, adapted to be engaged by any one of the key-levers that is depressed. A spring 30 serves to normally hold this arm 28 and its transverse bar 29 normally upward. The opposite end of this arm 28 is rigidly secured to the shaft 25, as before stated, and projecting from the shaft and rigidly secured thereto are the parallel coacting escapement or controlling arms 31. These arms, as shown in Fig. 2, are essentially triangular in shape and carry at their inner ends the rollers 32, which engage the under side of the sleeves or collars 27, and their outer or opposite ends are connected by a transverse tooth or bar 33, which is adapted to engage between the teeth of the wheel 19. A spring 34 has its upper end connected to the yoke 20 at a point eccentric thereto, whereby the spring serves to normally hold the yoke downward and its tooth 23 normally out of engagement with the teeth of the gear 19 and also to normally hold the yoke in engagement with a suitable stop 36. It will be noted by reference to Fig. 2 that the key-levers have their inner ends of various lengths, and therefore their shouldered ends 25' at various points throughout the arc of a circle surrounding the gear 19. The object of this construction is to have the shouldered portions of the key-levers to respectively engage the transverse portion 22 of the yoke 20 at various points throughout its circular oscillating movement, and therefore to permit the yoke and gear 19 to have more or less circular oscillation, according to the particular key-lever that is depressed. The mechanism just described constitutes the escapement mechanism, and the operation of this will now be explained.

By reference to Fig. 2 it will be seen that the key-lever 26 is depressed, which in turn depresses the universal arm 28, and the depression of this arm 28 has oscillated the arm 31, carrying the wheels 32 in engagement with the collars or sleeves 27 upon the yoke, and has vibrated the yoke transversely to carry the tooth 23 in engagement with the teeth of the gear 19. This same movement has also carried the tooth 33 out of engagement with the gear 19. The tooth 23 serves to normally lock the gear 19, and hence to normally lock the motor mechanism until one of the key-levers is depressed. When the key-lever is depressed, as just stated, the yoke is vibrated transversely and the tooth 23 caused to engage the wheel 19 and the tooth 33 is carried out of engagement with the wheel 19, thus releasing the wheel and permitting it to rotate until arrested by the engagement of the yoke with the shoulder 25' of the key-lever 26. In this way the wheel 19 is permitted to rotate a number of teeth corresponding to the numeral indicated by the key-lever which is depressed. When the key-lever is depressed, the tooth 23 of the yoke is carried in engagement with the teeth of the gear 19 before the tooth 33 is disengaged from the gear 19, and the instant the gear 33 is disengaged from the gear 19 the gear oscillates until stopped by the shoulder 25' of the key-lever. The key-lever being then released, the tooth 33 is carried in engagement with the gear 19 before the key-lever 26 is released, thus again locking the gear 19. The shouldered ends of the key-levers are so shaped or curved at the point 38 that they hold the tooth 23 of the yoke in engagement with the gear 19 until the key-lever is released and the yoke 20 permitted to drop. Before this occurs, however, as just stated, the tooth 33 is in engagement with the wheel 19 and the wheel locked against further movement. Immediately upon the release of the key 26 the spring 34 draws the yoke downward, disengaging its tooth from the gear 19, and also oscillates it to its normal position in engagement with the stop 36, ready to be again operated when the key-lever is depressed. From this description it will be noted that the gear 19 is permitted to rotate a number of teeth corresponding to the numeral indicated by the key-lever depressed, and in turn the gear 19 will, as hereinafter explained, cause a rotation of the numeral-wheels of the computing mechanism a number of teeth corresponding to the number of teeth upon the wheel 19 that have been permitted to escape through the mechanism just described, and hence compute the number of digits represented by the key-lever that is depressed.

*The carriage.*—The carriage 39 includes a suitable casing in which are journaled the shafts 40 and 41. The shaft 40 may be aptly termed a "master-shaft," and this shaft carries a pinion 42, which is normally in engagement with the gear 19, and when the gear 19 is permitted to escape a predetermined number of teeth, according to the key-lever which is depressed, as before explained, the pinion 42 is rotated a corresponding number of teeth, and hence the master-shaft 40 is rotated a corresponding distance. The shaft 41 carries a computing mechanism 43 and a series of combined sight and printing wheels 44. This computing mechanism and the combined sight and printing wheels are entirely separate and independent and are separately and independently actuated, though they are controlled in their movements through the medium of the key-levers, as will appear hereinafter. The carriage 39 travels in a direction across the machine from right to left, as indicated by arrows in Figs. 1 and 4. The mechanism for effecting the movement of the carriage will be presently described, it being sufficient to state at this point that when a key-lever is depressed the carriage is caused to travel one space, or from one numeral-wheel to the next, of both the computing and the combined sight and printing mechanisms.

I will now explain the computation and the combined sight and printing mechanism. Located on the shaft 40 is a wheel 45, which is adapted to engage, respectively, the numeral-wheels 46 of the computing mechanism, and also a wheel 47, which is adapted to engage, respectively and separately, the numeral-wheels 44 of the combined sight and printing mechanism. The carriage 39 is journaled upon the shaft 40 and slides back and forth thereon and is also adapted to be turned backward in the direction indicated by arrows in Figs. 2 and 3 for the purpose of exposing to the operator the computing mechanism and the combined sight and printing mechanism for purposes to be explained hereinafter. When the carriage has reached the limit of its movement to the left, as indicated in Fig. 4, the wheels 45 and 47 are out of engagement with both the computing and the sight and printing mechanisms to prevent the actuating of these mechanisms when the carriage is depressed to record or print the amounts or digits which are set up upon the combined sight and printing mechanism, the operation of which will be presently described.

It will be understood by those skilled in this art that the carriage is moved to the right to the desired point for setting up and computing the desired amount. For instance, if it is desired to compute and to set up upon the printing mechanism the amount "125" the carriage will be moved to the hundreds-point and the key indicating the numeral "1" pressed, which will actuate the hundreds-wheel 1 and the carriage be moved one space, the key depressed indicating the numeral "2,"

when the tens-wheel of the computing mechanism will be moved two spaces or teeth, and when the key is released the carriage will move another space, and the key "5" is depressed, which will move the units numeral-wheel of the mechanism five teeth, thus completing the amount "125." At the same time the wheel 47 has likewise engaged the numeral-wheels of the combined sight and printing mechanism and has set up thereon the numerals "125." The carriage is then depressed, and the printing-wheels will print, as will be hereinafter explained, upon the sheet of paper "125."

In order to assist the operator in properly positioning the carriage according to the amount that is to be computed and printed—for instance, in the hundreds, tens of hundreds, thousands, tens of thousands, &c.—and to make this position accurate, reliable, and easy, I provide a plurality of stops for the carriage which will determine for the operator the point at which the carriage is to be stopped in drawing it to its starting-point. This is accomplished through a medium of keys 50, (see Fig. 4,) which have indications of units, tens, hundreds, tens of hundreds, thousands, tens of thousands, and hundreds of thousands, and these actuate and control, respectively, the stops 51, which are carried at the inner ends of the intermediately-pivoted key-levers 52. When a key-lever indicating units is depressed, the proper stop 51 is thrown in the path of travel of the carriage, so that the carriage cannot be moved back beyond that point, and hence when one of the computing key-levers 24 is depressed it will compute in the proper column or upon the proper numeral-wheel, and the proper wheel of the printing mechanism will be correspondingly actuated for recording the computed amount. The operator will depress the proper stop-key and draw the carriage back until it is stopped thereby. For instance, if he is to compute and to record the amount "125" the hundreds stop-key will be depressed and the carriage drawn back until stopped thereby, when it will be in the proper position to properly compute the amount and to properly set up the amount on the printing mechanism to be recorded upon the strip of paper.

*Carriage-feed mechanism.*—The front edge of the carriage 39 is provided with a toothed portion 55, which is in engagement with a gear 56, and the opposite end of the carriage is provided with a supporting-wheel 56', which rests upon the upper base of the plate 57 of the machine. When the gear 56 is rotated one tooth, it moves the carriage a corresponding distance for the purpose of causing the wheels 47 and 45 to be in engagement, consecutively and respectively, with the proper numeral-wheel of the computing mechanism and the proper numeral-wheel of the printing mechanism. The wheel 56 is rotated one tooth at a time by the mechanism which I will now explain.

By reference to Figs. 2 and 7 it will be noticed that the gear 56 is attached to a shaft 58, which is journaled in arms 59, that extend laterally from a lever 60, and that the outer end of the lever 60 is pivoted at a point 61, which permits the opposite and inner end of the lever 60 to be depressed. This lever 60 has its inner free end normally held in an upward position through the medium of an intermediately-pivoted spring-held lever 62, pivoted at the point 63, with the inner end of the lever in engagement with the inner free end of the lever 60, that carries the cog-wheel 56. A spring 64 is connected to the inner end of the lever 60 and serves to hold its opposite and outer end normally upward, and it being in engagement with the inner end of the lever 60 serves also to hold it normally upward. The inner end of the shaft 58 carries a crank-arm 65, to which is pivoted a pawl 66, that is adapted to engage with the cog-wheel 56. The shaft 58 is oscillated when a key-lever is depressed to move the pawl 66 loosely downward over one tooth of the cog-wheel 56, and when the key-lever is released the shaft 58 is oscillated in the opposite direction sufficiently to move the cog-wheel through the intervention of the crank-arm 65 and pawl 66 one tooth, and to consequently move the carriage a corresponding distance. The depression of one of the key-levers causes a movement of the carriage through the medium of a link 67, which has its upper end connected with a crank-arm 68, and the opposite and lower end of this link 67 is connected with the universal bar 29. Hence when a key-lever is depressed the universal bar is depressed, and in turn the shaft 58 is oscillated sufficiently to carry the pawl 66 loosely over one cog of the wheel, and when the key-lever is released the universal bar is forced upward through the medium of the spring 30, which is sufficiently strong to cause the carriage to oscillate the shaft 58 in the opposite direction, and to therefore, through the intervention of the cog-wheel 56, cause the carriage to move one tooth or space in the direction indicated by arrows in Figs. 1, 4, and 8.

*Paper-feeding mechanism.*—Situated within the casing is the paper-roll 70, (indicated by dotted lines in Fig. 6,) and the paper passes from this roll through a suitable slot in the plate 71 and passes rearward over the said plate between the rollers 72 and 73, the outer ends of the rollers being geared together and caused to rotate in unison through the medium of the gears 74. The shaft of the lower roller 73 and at the opposite end from the gear 74 is provided with a ratchet-wheel 75, Figs. 2 and 7, and a spring-pawl 76 is adapted to engage the ratchet-wheel for the purpose of rotating it after each printing action through the depression of the carriage for that purpose, as will now be explained.

A ribbon 77 passes across the paper at the printing-point and directly below the type upon the combined and sight and printing wheels 44, whereby when the front and free ends of the carriage are depressed the numerals to be printed will be carried in contact with the ribbon and be printed upon the paper 78 therebelow. The ribbon is fed through the intervention of a ratchet-wheel 79 upon one end of the ribbon-shaft 80 and a spring-pawl 81, suitably connected with the inner free end of the intermediately-pivoted lever 62.

*Paper and ribbon feeding operation.*—As before stated, the lever 62, which carries the carriage-feeding wheel 56, is pivoted so that its inner end can be depressed. When the amount has been set up (as before described) upon the printing mechanism and the computation made (as before described) by the computing mechanism, the front edge of the carriage is depressed by striking or pushing downward upon a handle 82. When the carriage is depressed, it carries with it the inner end of the lever 62 and this depresses the lever 60, and through the intervention of the spring-pawls 76 and 81 the paper and the ribbon are fed the desired distance after the printing has been accomplished and during the rising movement of the outer or front portion of the carriage.

In order to prevent a depression of the carriage until it has reached the limit of its movement in the direction indicated by arrows in Figs. 1, 4, and 8, (and has therefore set up the units-wheel of the printing mechanism and made the units computation, at which time the carriage will have reached the position shown in Fig. 4, thus carrying the wheels 45 and 47 out of engagement with the computing and printing mechanism,) the wheel 56' rests upon the plate 71 until the carriage has reached the position shown in Fig. 4, when the wheel 56' will run off onto the inner free end 90 of the spring-actuated lever 91, at which point the carriage can be depressed. It will be readily understood, however, until the wheel 56' is resting upon the free end 90 of the lever 91 the carriage cannot be depressed, because the wheel will be resting upon the rigid plate 71. As before stated, this will prevent the operator from making a mistake in printing before the complete computation and the complete setting of the printing mechanism have been accomplished, and thus prevent any consequent error in attempting to print before the whole amount to be printed and computed has been set up and computed. When in this position, the wheels 45 and 47, as before stated, are out of engagement with the computing and the printing mechanism, as shown in Fig. 4, whereby a depression of the carriage will not actuate either the computing or printing mechanism, and therefore will not disturb the computed amount of the computing mechanism or the set-up amount of the printing mechanism to be recorded upon the paper 78.

*Computing mechanism.*—Referring now to Figs. 2 and 11, it will be seen that the wheel 45, which is actuated, as before stated, through the medium of the spring-motor, in turn actuates the numeral-wheel 46 of the computing mechanism 43. A square shaft 93 supports a plurality of disks 94, which have correspondingly-angular openings to prevent the rotation of the disks. A disk is situated between each numeral-wheel 46, and thus prevents them from engaging with each other and prevents the rotation of one having any tendency to rotate an adjacent wheel. Each numeral-wheel 46 is provided with a ratchet-wheel 95, and the adjacent numeral-wheel is provided with a spring-pawl 96, adapted to engage the said ratchet-wheel. The disks 94, as before stated, are held against rotation upon the square shaft 93, and each of these disks is provided with a cut-out portion 95, which coacts with the spring-pawl 96 to cause the spring-pawl to be disengaged from the ratchet-wheel after the ratchet-wheel has been moved one notch, as will be readily understood by those skilled in this art. While I show and describe this form of carrying mechanism, it will be readily understood that any desired form of carrying mechanism may be provided for the computing mechanism. The manner of carrying from one numeral-wheel to the next by any desired form of carrying mechanism is so well understood by those skilled in the art that further description is unnecessary.

For the purpose of enabling the total to be wiped out of the computing mechanism and the numeral-wheels returned to "0" or zero the square shaft 93 is provided with an operating-handle 99, by means of which it can be rotated, and the free end of the handle is provided with a projection 100, adapted to enter an opening 101 made in the end of the carriage-casing for locking the lever, and hence locking the shaft. When the shaft is to be rotated, the lever is drawn outward until the projection is disengaged from the opening, when it can be rotated. By reference to Fig. 2 it will be noted that a rod or shaft 102 is provided, and this shaft carries a spring dog or pawl 103 for each numeral-wheel. Each numeral-wheel is provided with a pin, notch, or projection 104, with which the spring-dogs are adapted to engage. When it is desired to wipe out the total upon the computing or numeral wheels, the dogs 103 are thrown into the position shown in Fig. 2 through the medium of a suitable handle 105 and the shaft 93 is given one rotation through the medium of the handle 99, as before stated, which will cause the total to be wiped out and naughts to appear through the opening 106 made in the carriage 39.

In Figs. 4 and 11 it is shown that the wheel 45 is provided with a clutch member 107, adapted to engage with a corresponding clutch member upon the pinion 42. By this means the wheel 45 can be thrown out of gear with the actuating mechanism by moving it to the right of Figs. 2 and 11. The object of providing this disconnecting device is for the purpose of enabling the total amount to be set up on the printing mechanism directly from the visible total upon the computing mechanism through the opening 106 without disturbing the computing mechanism when the total is to be printed. This will enable the operator to set up the total upon the printing mechanism to be printed directly from the total appearing upon the computing mechanism and to compare the set-up total through the opening 108 before it is printed to see that it correctly corresponds to the total appearing upon the computing mechanism through the opening 106. This clutch is actuated through the medium of a lever 109, which is journaled upon a screw 110, the said screw being supported by a bracket-shield 111. The lever 109 carries a cam 112, which engages with a slot 114 in the free end of a crank-arm 115, the said crank-arm being connected to a shaft 116. This shaft carries at its opposite end an arm 117, which has its upper free end adapted to engage in the groove 118 of the clutch member of the wheel 45. The cam carried by the lever 109 is of such form, as here shown, that the clutch will be locked either in its operative or inoperative position.

The numeral-wheels 46 are prevented from "throwing over" by their independent frictional contact with the intermediate disks 94, which, as before stated, are held against revolution upon the shaft 93. While the disks are not permitted to rotate on the shaft, they have a sliding endwise movement thereon, and a spring 119, placed upon the shaft, serves to force the numeral-wheels in contact with the disks, and thus create a sufficient friction against the disks to prevent them from throwing over in the operation of the machine.

*Printing or recording mechanism.*—At the left-hand side of the carriage, as shown in Figs. 1 and 4, is situated the recording or printing mechanism 44. This consists of a plurality of numeral-printing wheels 44, which are termed "combined printing and sight wheels," for the reason that they serve for recording or printing, and also serve as sight or indicating wheels for the operator to see that the amount he has set up to be printed corresponds with the amount he wishes to print and also corresponds with the amount which he wishes to compute. Therefore the operator immediately upon setting up a figure sees it through the opening 108, and an error is instantly visible. After he has set up the amount he can also compare it with that from which it is copied, and if it is not correct he can move the carriage to the position shown in Fig. 4, turn it up, and make the correction upon the computing mechanism by simply turning the numeral-wheels by hand. He can then either make the correction upon the printing-wheels in the same way or can wipe them out and begin over again. The numerals to be printed will be on the teeth or projections of the wheels 44 and the sight-numerals will be in the spaces 131 between the teeth or projections, and the numerals will be so situated that the numerals to be printed by the lower projection will show through the opening 108 and between the projections or teeth. Owing to this construction the wheels 120 are combined printing and sight wheels and avoid the necessity of having separate mechanisms for printing and for sight or indicating purposes, which greatly simplifies a machine of this character.

By reference to Figs. 10 and 11 it will be noticed that there is situated between the numeral-wheels a disk 122 and that the shaft 123 upon which the disks and wheels are located is angular in cross-section. The disks 122 have corresponding angular openings, so that they are held against rotary movement upon the shaft 123. Convolute springs 124 (shown in dotted lines, Fig. 10, and in full lines, Fig. 11) have one end attached to the intermediate disk and their opposite end connected with the printing-wheels. Each disk is provided with a projection 125, which engages a pin 126, and thus holds all of the printing-wheels with the naught or zero appearing through the opening 108 and the corresponding figures located below and over the printing-point. A shaft 126' passes longitudinally through a portion of the case and extends parallel with the carriage 123. This shaft 126' carries a plurality of spring-actuated pawls 127, each pawl provided with a collar 128, and the shaft with a pin 129 extending in the slot 130, made in each collar of each pawl. By this arrangement the pawls engage the printing-wheels 120 and the slots permit them to have a sufficient amount of movement to allow the wheels to be rotated against the tension of the volute springs 124, and the pawls will lock them to their turned positions against the tension of the springs. These printing-wheels, as before explained, are actuated in sequence through the medium of the wheel 47 when the numeral-key levers are operated and the desired numerals are set up upon the printing-wheels in position to print upon the paper when the carriage is depressed for that purpose.

It is desirable that those printing-wheels which lie beyond the point at which they are set up shall be so turned as not to print any character at all—that is, if the numerals 1, 2, and 5 are set upon the printing-wheels those located beyond the hundreds position must be so turned that no character will be printed, and thus prevent a printing of a confusing series of naughts. This is accomplished through the medium of a bail which has its arms 130 pivoted upon the shaft 41 and is bell-crank shaped in end view, as shown in Fig. 9. The outer portion 131' of this bail forms a handle to be used in the manner presently set forth. The opposite end of this bail or bell-crank lever carries an angular bar or rod 131'', upon which is placed a block 132, the said block being adapted to slide upon the rod and limit it in its movement toward the right through the medium of a pin 133, projecting from the said rod 131. A spring 134 is placed on this rod and serves to normally hold the block against said pin. By reference to Fig. 4 it will be noted that this bar does not extend to the tens printing-wheel, which will thus permit the tens printing-wheel to print a naught—as, for instance, in recording one to nine cents. By reference to Fig. 9 it will be noticed that this block 132 is of a size to slide between the teeth of the printing-wheels, and the outer or handled end of the bail is so weighted that when it is resting in the carriage bracket or handle 135 it will turn those wheels with which the bar is in engagement to carry the teeth or projections of the wheels which contain the printing characters out of the printing position and presenting the spaces between the teeth at the printing-point, so that when the carriage is depressed to print those wheels with which the block is in engagement will not print any character. Projecting from the shaft 40 and located between the wheel 47 and a collar 136 is an arm 137, which is located in the path traveled by the bar 132 and is adapted to engage it when the carriage is moved to the right and to force the bar endwise upon the rod 131'' against the tension of the spring 134. The object and operation of this are as follows: When it is desired, for instance, to set up and to compute the number "4125," the thousands stop-key is depressed and the carriage is drawn to the right till it engages the stop. The movement of the carriage will have caused the block 132 to engage the arm 137 and move it endwise and carry it out of engagement with all of the printing-wheels, beginning with the thousands-wheel. The carriage is moved endwise ordinarily through the medium of the handle 130 of the bail, and the bail is lifted, lifting the carriage out of engagement with its feeding-wheel 56, and this movement will carry the block in the position indicated in Fig. 9. When the handle 131' is released, it will fall into the bracket-handle 135, which will carry the block 132 and cause one of its grooves, 140, to engage with a projection 141 upon the inner side of the casing of the carriage, and the bar will be locked in this position until the handle 131' is again lifted. Hence should there be several amounts to be printed, which begin with the thousands-column, the operator will lift the carriage through the medium of the handle-bracket 135, which will cause the block to remain in engagement with the projection 141 and prevent the carriage, by the engagement of the block with the arm 137, from being moved beyond the thousands-point and prevent the necessity of the operator using the thousands stop-lever. This will be true in respect to a repetition (as will be readily understood) of any series of amounts which begin in the same column. When it is desired to set up or to compute a number beginning in a different column from that in which the preceding number began, the operator lifts and moves the carriage through the medium of the handle 131' of the bail, which immediately disengages the block from the projection 141 and permits the carriage to be moved to the proper stop, according to the amount that is to be set up and that is to be computed.

At the left of the printing mechanism just described is an auxiliary printing mechanism which may or may not be used, but which is provided because convenient and desirable in some institutions or by some users to print the month, the day of the month, and a designation of the amount printed—as, for instance, the words "Balance," "Cash," or any other designation of the amount that has been computed and that is printed upon the strip of paper. To accomplish this, a wide printing-wheel 150 is provided to contain the designation of the amount printed, and two numeral-wheels 151 for the day of the month and a correspondingly wider wheel 152 representing the month. These auxiliary printing-wheels are to be turned by hand, and the carriage will be turned backward for the purpose of enabling the operator to turn the wheels by hand. These wheels will be locked in their desired position through the medium of the locking-levers 153, which, as shown in Fig. 9, have their lower ends provided with a notch 154, adapted to engage one of the printing characters or projections and lock its respective wheel in a printing position. These levers are also so constructed that the walls of the notches 154 form projections 155, adapted to fit between the printing characters of the wheel, and thus support them out of printing position when it is desired to have them fail to print.

After a number has been set up upon the printing-wheels and has been computed by the computing mechanism and it is desired to set up another number for printing and computation it is necessary that the printing-wheels be returned to their normal or naught positions. I provide means for doing this automatically, and it consists in having the shaft 126', upon which the spring-pawls 127 are located, oscillated through the upward movement of the carriage after it has been depressed for printing. This is accomplished as follows: A spring-dog 160 is suitably pivotally supported in a position to engage a shouldered collar 161, carried by the projecting end of the said shaft 126. When the carriage is depressed, the upper shouldered end of this dog 160 will engage the shoulder of the collar 161, and when the carriage moves upward it will cause a sufficient oscillation of the shaft to move the spring-dogs 127 out of engagement with the printing-wheels through the medium of the pins carried by the shaft engaging the walls of the slots in the collars of the spring-dogs.

The naught-key 170, Figs. 4 and 8, is not connected with the computing mechanism, nor is it connected with the printing mechanism. As is well understood by those skilled in the art, it is never necessary to compute the cipher naught by the operation of a key for that purpose, and since all of the wheels of the printing mechanism are normally at naught and ready to print that numeral it is unnecessary to connect the naught-key with the printing mechanism. Thus it will be readily understood that it is only necessary for the naught-key to operate the carriage-feeding mechanism one space in order to print the naught of the printing mechanism at the proper point upon the paper for printing that numeral. By reference to Fig. 8 the construction and operation of the naught-key 170 is shown. This consists of an intermediate lever 171, to which the lower end of the key-lever 170 is connected, and the opposite end of this lever 171 engages with one end of an intermediately-pivoted lever 172. The opposite end of this intermediately-pivoted lever 172 is a part or extension of the crank 68, forming a part of the carriage-feeding mechanism, which has been heretofore explained. In order to prevent an operation of the universal bar 29 and its connecting members, which form a part of the escapement mechanism heretofore described, when the naught-key lever is depressed, the upper end of the link 67 is provided with a longitudinal slot 173', whereby when the naught-key 170 is depressed the crank 68 moves downward in respect to the link 173 without actuating the link, and hence without actuating the universal bar which forms a part of the escapement mechanism. Therefore the depression of the naught-key 170 merely oscillates the crank 68 and the shaft 58, and in turn the shaft 65, carrying the pawl 66, sufficiently to move the pawls one tooth upon the wheel 56. When the key 170 is released, the spring 174 moves the shaft back to its original position, and therefore actuates the wheel 66 one tooth and in turn moves the carriage one space.

From the foregoing description and drawings it will be noted that I have provided an improved computing mechanism which may be used without the intervention of a printing mechanism, and it will also be noted that I have provided an improved computing mechanism and sight-wheels which may be used only as sight-wheels, and not as combined sight and printing wheels, where it is not desired to print the amount which is computed. In this latter event the sight-wheels will merely serve as an indication to the operator that he has computed the proper amount, or, in other words, has copied the amount correctly which he wants to compute.

Having thus described my invention, what I claim, and desire to secure by Letters Patent, is—

1. A calculating mechanism including an actuating-wheel, a computing mechanism actuated thereby and transversely movable in respect thereto, a reciprocating and oscillating escapement member normally out of engagement but adapted to engage the said wheel, a dog, a member controlling the said dog and the reciprocating movement of the said escapement member, a universal key member connected with the aforementioned member, a plurality of keys adapted to actuate the universal-key member, and means controlled by the key-levers for interrupting the oscillation of the escapement member at various points throughout its oscillating movement.

2. A calculating mechanism including an actuating-wheel, a computing mechanism actuated thereby and transversely movable in respect thereto, a U-shaped yoke adapted to oscillate and reciprocate upon the axis of the said wheel, a plurality of key-levers constructed to interrupt the oscillating movement of the yoke at various points throughout its oscillating movement, the yoke having a projection adapted to engage the said wheel, an oscillating member common to and adapted to be actuated by the said key-levers, the said oscillating member carrying a dog adapted to engage and disengage the said wheel and carrying a member adapted to reciprocate the said yoke, whereby the dog is carried out of engagement with the wheel and the projection of the yoke in engagement therewith when one of the key-levers is depressed.

3. A calculating mechanism including an actuating-wheel, a computing mechanism actuated thereby and transversely movable in respect thereto, an escapement member normally out of engagement with the wheel, a movable dog normally in engagement with the wheel but adapted to disengage it, a plurality of key-levers having their inner ends constructed to hold the escapement member in engagement with the wheel and provided with shoulders adapted to interrupt the oscillating movement of the escapement member, and means common to the said key-levers controlling the movement of the dog and the reciprocating movement of the escapement member.

4. A calculating mechanism including an actuating-wheel, a computing mechanism actuated thereby and transversely movable in respect thereto, a plurality of key-levers having their inner ends curved eccentrically to the said wheel, an escapement member normally out of engagement with the wheel and adapted to engage the curved portion of the said key-levers, the key-levers having shoulders situated at various points throughout the oscillation of the escapement member, the escapement member having a portion common to the inner ends of all of the key-levers, and means common to the key-levers for controlling the reciprocating movement of the escapement member, and the movement of the said dog.

5. A calculating and printing mechanism including a computing and a printing mechanism, the said mechanisms being transversely movable, a reciprocating and oscillating member adapted to engage the numeral members of the printing mechanism which are not actuated by the key-controlled mechanism, and means for reciprocating the said reciprocating and oscillating member in respect to the said printing members, through the horizontal movement of the printing mechanism.

6. A calculating and printing mechanism including a computing mechanism, a printing mechanism, wheels adapted to independently control the computing and the printing mechanisms, the computing and the printing mechanisms movable transversely the said wheels and normally out of operation therewith, the printing mechanism movable transverse its axis for printing when it is out of engagement with its actuating-wheel, and a key-controlled mechanism controlling the said wheels.

7. A calculating and printing mechanism including a computing and printing mechanism movable horizontally and vertically, wheels for independently actuating the two mechanisms, and a key-controlled mechanism controlling the said wheels.

8. A calculating and printing mechanism including a computing and printing mechanism having a horizontal and a vertical movement, the printing and computing mechanism adapted to be moved out of engagement with their actuating-wheels when the amount has been computed and set up upon the printing mechanism, and means for moving the printing mechanism vertically for printing the set-up amounts or numbers.

9. A calculating and printing mechanism including a horizontally and vertically movable carriage, a computing and a calculating mechanism supported thereby, means for moving the carriage horizontally, a key-controlled mechanism controlling the computing, the printing and the carriage mechanisms, the carriage-feeding mechanism being vertically movable to permit the depression of the carriage for printing.

10. A calculating and printing mechanism including a computing mechanism, a printing mechanism, a key-controlled mechanism controlling the computing and the printing mechanism, the printing mechanism including a plurality of spring-actuated numeral members, dogs for holding the numeral members against the tension of the springs when they are not moved through the medium of the key-controlled mechanism, the printing mechanism being vertically movable, and means controlled by the vertical movement of the printing mechanism for automatically actuating the dog and releasing the printing members to permit the springs to return them to their normal positions.

11. A calculating and printing mechanism including a horizontally and vertically movable carriage, means for moving the carriage, a key-controlled mechanism controlling the computing, the calculating mechanism and the carriage-moving mechanism, and means for preventing the depression of the carriage until the last number to be computed and set upon the printing mechanism has been computed and set up.

12. A calculating and printing mechanism including a printing and computing mechanism, a key-controlled mechanism controlling the computing and the printing mechanism, a vertically and horizontally movable carriage carrying the said mechanisms, means for controlling the members of the printing mechanism which are not controlled by the key-controlled mechanism owing to the horizontal position of the carriage, and means for controlling the oscillation of the said oscillating members by means of which the carriage can be lifted when moved horizontally to its starting position.

13. A calculating and printing mechanism including a horizontally and vertically movable carriage, means for moving the carriage horizontally, a key-controlled mechanism controlling the computing and the printing mechanism, means for normally holding those members of the printing mechanism out of printing position which are not controlled by the key-controlled mechanism owing to the horizontal position of the carriage, means for locking the said controlling member, and means for lifting and moving the carriage without operating the locking mechanism of the reciprocating member.

14. A calculating and printing mechanism including a computing mechanism, a printing mechanism, actuating-wheels therefor, the said mechanisms having a movement transverse the said wheel and also a vertical movement, a key-controlled mechanism controlling the said wheel, and means for throwing the computing mechanism out of operation when it is desired to actuate the printing mechanism independently thereof.

15. A calculating and printing mechanism including a horizontally and vertically movable carriage carrying concentrically-arranged computing and printing mechanisms, wheels independently operating the said mechanisms, a key-controlled mechanism controlling the said wheels, the computing and printing mechanisms being thrown out of engagement with their actuating-wheels when the complete number has been computed and set up upon the printing mechanism whereby the vertical movement of the carriage to cause the printing will not actuate either of said mechanisms.

16. A calculating and printing mechanism including a transversely and vertically movable carriage, a computing and a printing mechanism carried thereby, wheels adapted to independently operate the said mechanisms, a key-controlled mechanism controlling the said wheels, a plurality of keys representing the numerals from "1" to "9" and adapted to correspondingly control the said key-controlled mechanism, and means for moving the carriage controlled by said keys after the computing and printing mechanisms have been operated.

17. A calculating and printing mechanism including a horizontally and vertically movable carriage, a computing and a printing mechanism carried thereby, a plurality of keys representing the numerals from "1" to "9" inclusive and mechanism controlled by the keys adapted to correspondingly control the computing and the printing mechanisms, means for moving the carriage horizontally, said means controlled by the said keys, and the key representing the numeral naught disconnected from said computing and printing mechanism but operatively connected with the carriage-moving mechanism.

In testimony whereof I have hereunto set my hand in the presence of two subscribing witnesses.

FRANK S. BALDWIN.

Witnesses:
  CHAS. E. WEEKS,
  WM. H. EMERSON.